United States Patent [19]
Dickol et al.

[11] Patent Number: 5,898,850
[45] Date of Patent: Apr. 27, 1999

[54] METHOD AND SYSTEM FOR EXECUTING A NON-NATIVE MODE-SENSITIVE INSTRUCTION WITHIN A COMPUTER SYSTEM

[75] Inventors: John Edward Dickol; Bernard Charles Drerup, both of Austin, Tex.

[73] Assignee: International Business Machines Corporation, Armonk, N.Y.

[21] Appl. No.: 08/829,023

[22] Filed: Mar. 31, 1997

[51] Int. Cl.[6] ....................................................... G06F 9/30
[52] U.S. Cl. .............................................. 395/570; 395/384
[58] Field of Search ..................................... 395/570, 384, 395/589, 591

[56] References Cited

U.S. PATENT DOCUMENTS

| | | |
|---|---|---|
| 4,587,612 | 5/1986 | Fisk et al. . |
| 4,631,663 | 12/1986 | Chilinski et al. ........................ 395/570 |
| 4,763,255 | 8/1988 | Hopkins et al. . |
| 4,783,738 | 11/1988 | Li et al. . |
| 4,961,141 | 10/1990 | Hopkins et al. . |
| 5,136,696 | 8/1992 | Beckwith et al. ........................ 395/587 |
| 5,142,681 | 8/1992 | Driscoll et al. . |
| 5,163,139 | 11/1992 | Haigh et al. . |
| 5,193,180 | 3/1993 | Hastings . |
| 5,201,056 | 4/1993 | Daniel et al. . |
| 5,241,636 | 8/1993 | Kohn ....................................... 395/391 |
| 5,333,296 | 7/1994 | Bouchard et al. . |
| 5,333,344 | 8/1994 | Hastings . |
| 5,355,460 | 10/1994 | Eickemeyer et al. . |
| 5,430,862 | 7/1995 | Smith et al. ............................. 395/568 |
| 5,481,684 | 1/1996 | Richter et al. .......................... 395/388 |
| 5,490,256 | 2/1996 | Mooney et al. . |
| 5,535,329 | 7/1996 | Hastings . |
| 5,542,059 | 7/1996 | Blomgren ................................ 395/384 |
| 5,574,927 | 11/1996 | Scantlin .................................. 395/376 |
| 5,692,170 | 11/1997 | Isaman .................................... 395/591 |
| 5,768,593 | 6/1998 | Walters et al. .......................... 395/705 |
| 5,781,750 | 7/1998 | Blomgren et al. ...................... 395/385 |

*Primary Examiner*—William M. Treat
*Attorney, Agent, or Firm*—Casimer K. Sayls; Antony P. Ng; Andrew J. Dillon

[57] ABSTRACT

A method for executing a non-native mode-sensitive instruction within a computer system is disclosed. In accordance with the method and system of the present invention, a computer system as described, capable of executing a non-native mode-sensitive instruction, includes a system memory, an instruction set convertor, and a processor. The system memory is utilized to store the non-native mode-sensitive instruction. The instruction set convertor, having a Semantics Table, is utilized for converting the non-native mode-sensitive instruction to a group of native instructions by preemptively testing whether or not the mode-sensitive instruction is preceded by a mode-altering instruction within a single block, and for accessing the Semantics Table for the non-native instruction with an address according to the preemptive testing. The processor is then utilized to process the group of native instructions from the instruction set convertor.

10 Claims, 4 Drawing Sheets

METHOD AND SYSTEM FOR EXECUTING A NON-NATIVE MODE-SENSITIVE INSTRUCTION WITHIN A COMPUTER SYSTEM

CROSS-REFERENCE TO A RELATED PATENT APPLICATION

The present invention is related to the subject matter of a co-pending United States Patent Application entitled "Method and System for Translating a Non-Native Bytecode to a Set of Codes Native to a Processor Within a Computer System," filed of even date herewith, Ser. No. 08/829,022, and assigned to the assignee herein named. The content of the above-mentioned co-pending patent application is incorporated by reference herein.

BACKGROUND OF THE INVENTION

1. Technical Field

The present invention relates to an improved method and system for data processing in general and, in particular, to an improved method and system for processing non-native instructions within a computer system. Still more particularly, the present invention relates to an improved method and system for executing non-native mode-sensitive instructions within a computer system.

2. Description of the Prior Art

The World Wide Web, or as it is simply known as, the "Web," has dramatically changed the on-line world and continues to grow in popularity. As a communications system, the Web allows information providers to distribute and collect information globally and instantly. For users, the Web is a dynamic view into the works and ideas of millions of people worldwide. Through a system of hypertext, users of the Web are able to select and view information from all over the Web. While the hypertext system gives Web users a high degree of selectivity over the information they choose to view, their level of interactivity with that information is low. Even with improvements such as hypermedia, which opens up many new kinds of sensory input for the Web users, including access to graphics and videos, the Web itself still lacks a true interactivity, that is, a kind of real-time, dynamic, and visual interaction between Web users and applications.

Java[1] brings this missing interactivity to the Web. With Java, animations and interactive applications on the Web become feasible. Java's features enrich communication, information, and interaction on the Web by enabling the distribution of executable content-rather than just Hypertext Markup Language (HTML) pages and hypermedia files-among Web users. This ability to distribute executable content is one of the powerful features of Java.

In order to view and interact with animations and the interactive applications on the Web, a Web user must have a computer installed with a Java-enabled Web browser. Even so, because Java has an instruction set that is different from the instruction set of most, if not all, processors utilized within a Web user's personal computer, Java instructions typically cannot be executed in their original bytecode form. Hence, some form of translation from the Java instruction set to an instruction set associated with the processor

[1] Java is a trademark of Sun Microsystems, and is also the name of a programming language developed by Sun Microsystems. within the personal computer is required. Conventionally, an instruction set associated with a particular processor is called a "native" instruction set to that computer, while an instruction set that is not specifically developed for that particular processor is called a "non-native" instruction set to that particular computer. In this case, Java would be a non-native instruction set with respect to the Web user's computer.

Most instruction sets have instructions that affect the way subsequent instructions are suppose to behave. These instructions are known as "mode-altering" instructions. Not surprisingly, there is one mode-altering instruction called "WIDE" in the Java instruction set, which affects the way an immediate subsequent instruction executes. Only certain instructions out of the entire Java instruction set are allowed to follow this WIDE instruction. These certain instructions include ILOAD, FLOAD, ALOAD, LLOAD, DLOAD, ISTORE, FSTORE, ASTORE, LSTORE, DSTORE, and RET. For the sake of convenience, these "mode-sensitive" instructions that are permissible to follow the WIDE instruction will be referred to as "wideable" instructions.

When a wideable instruction is encountered, there are two different sets of native code that could be generated, based on whether or not the preceding instruction is a WIDE instruction. One method of handling this is to have the native code for the WIDE instruction set a condition register in the processor. Then, the native code for wideable instructions begins with a test of the condition register and branches accordingly. This method is not only slow, but it also requires the execution of several native instructions for the testing of the condition register before branching. It further requires the generation of native instructions for both the widened and the unwidened versions of the wideable instructions, which takes up space in the primary cache, and ultimately leads to reduction in system performance.

Due to the large number of wideable instructions that are commonly encountered in a program written in Java, the execution time of these wideable instructions has a large impact on system performance. Consequently, it would be desirable to provide an improved method for executing these types of non-native wideable instructions within a computer system.

SUMMARY OF THE INVENTION

In view of the foregoing, it is therefore an object of the present invention to provide an improved method and system for data processing.

It is another object of the present invention to provide an improved method and system for processing non-native instructions within a computer system.

It is yet another object of the present invention to provide an improved method and system for executing non-native mode-sensitive instructions within a computer system.

In accordance with the method and system of the present invention, a computer system as described, capable of executing a non-native mode-sensitive instruction, includes a system memory, an instruction set convertor, and a processor. The system memory is utilized to store the non-native mode-sensitive instruction. The instruction set convertor, having a Semantics Table, is utilized for converting the non-native mode-sensitive instruction to a group of native instructions by preemptively testing whether or not the mode-sensitive instruction is preceded by a mode-altering instruction within a single block, and for accessing the Semantics Table for the non-native instruction with an address according to the preemptive testing. The processor is then utilized to process the group of native instructions from the instruction set convertor.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be executed in a variety of computers under a number of different operating systems. The computer may be, for example, a personal computer, a midrange computer, or a mainframe computer. In addition, the computer may be part of a network such as a local-area network (LAN) or a wide-area network (WAN). For the purpose of illustration, a preferred embodiment of the present invention, as described below, is implemented on a computer system having a PowerPC™ processor manufactured by International Business Machines Corporation.

Figure 1:
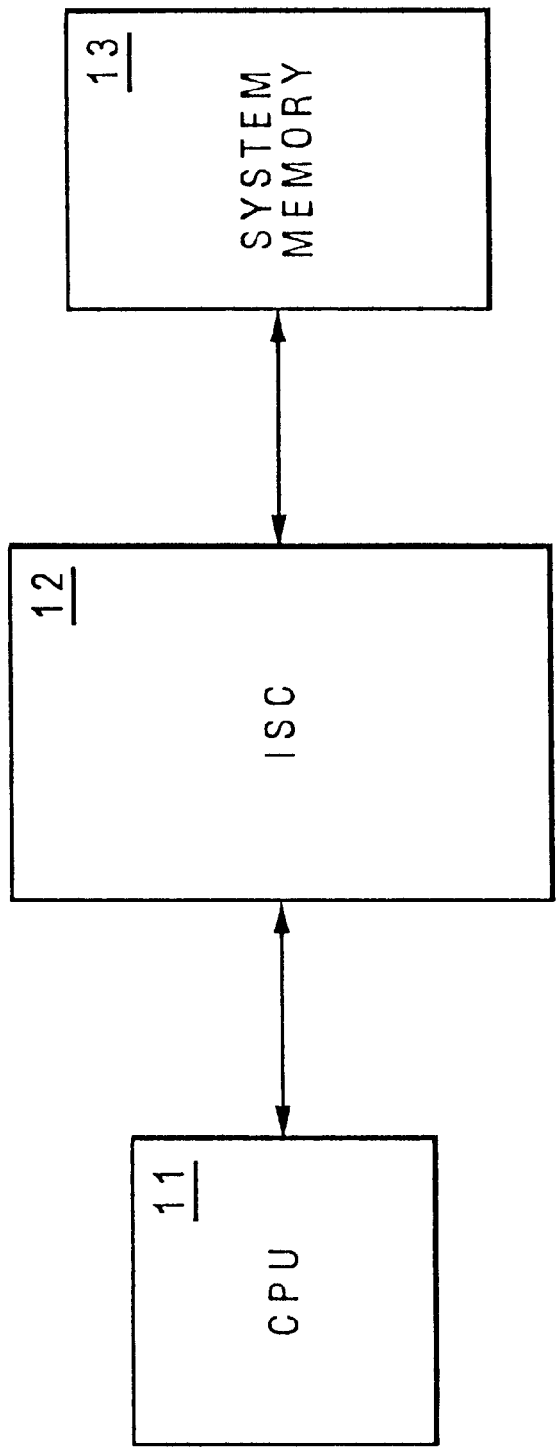
FIG. 1 is a block diagram of a system configuration that may be utilized by a preferred embodiment of the invention.

Referring now to the drawings and in particular to FIG. 1, there is depicted a block diagram of a system configuration that may be utilized by a preferred embodiment of the present invention. System configuration 10 includes a central processing unit (CPU) 11, an instruction set convertor (ISC) 12, and a system memory 13. As shown, ISC 12 is coupled between CPU 11 and system memory 13. Java programs consist of compiled Java instructions and are stored in system memory 13. When CPU 11 is performing an instruction fetch in system memory 13, ISC 12 determines what type of instruction CPU 11 is fetching. If the fetch is for a native instruction, then ISC 12 passes the fetch directly to system memory 13. However, if the fetch is for a non-native Java instruction, then ISC 12 performs the following steps:
a. intercepting the instruction fetch before it reaches system memory 13;
b. fetching corresponding Java instruction from system memory 13;
c. translating the Java instruction to PowerPC™ instruction(s);
d. returning the PowerPC™ instruction(s) to CPU 11.

The PowerPC™ instruction(s) from the translation is only passed to CPU 11 and is not stored anywhere in system memory 13.

Figure 2:
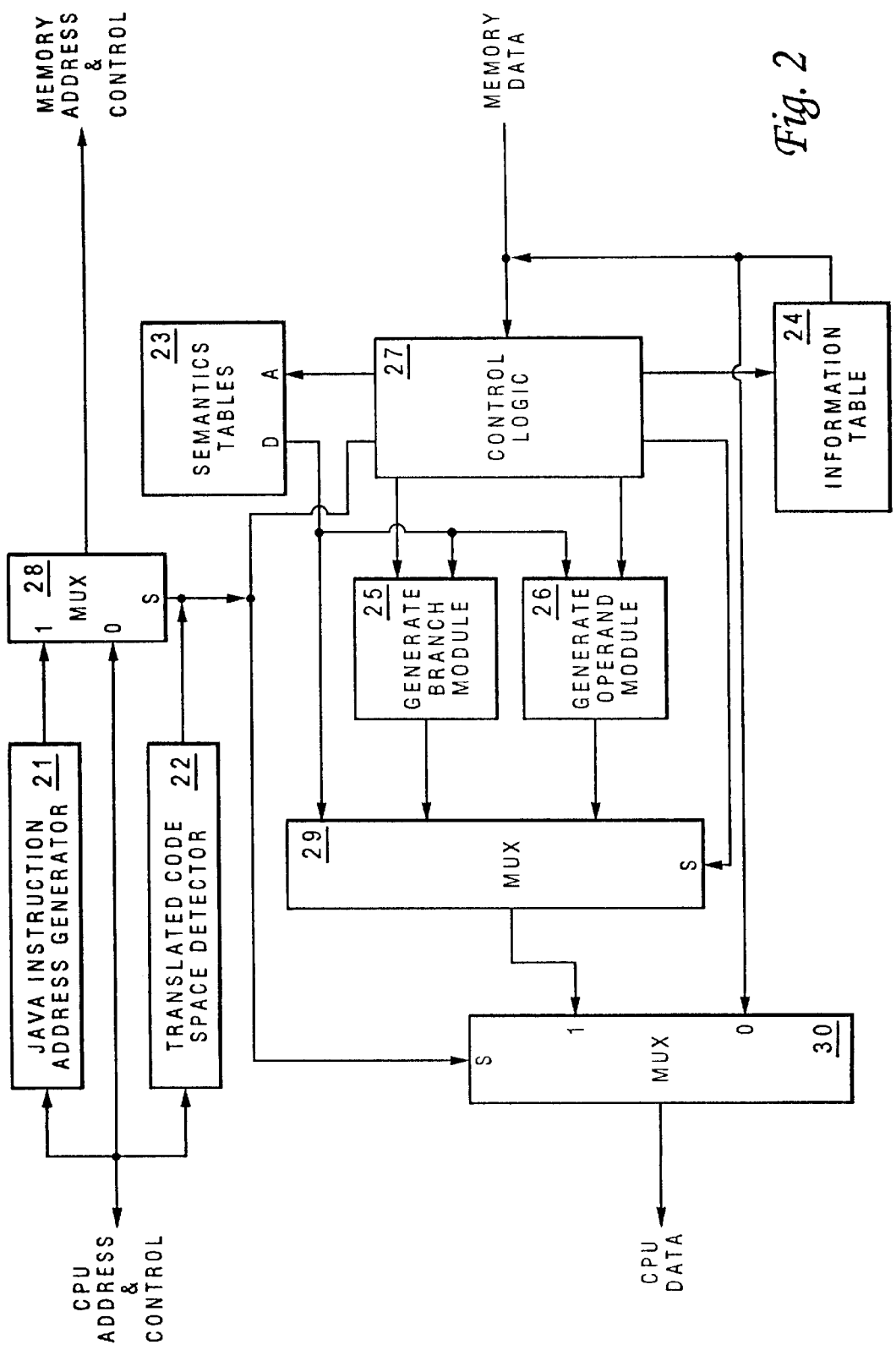
FIG. 2 is a detailed block diagram of the instruction set convertor of FIG. 1.

With reference now to FIG. 2, there is illustrated a detailed block diagram of the ISC in FIG. 1. During initialization, a segment of address space in CPU 11 is selected for the execution of Java programs as a "translated code space," and ISC 12 is informed of the location of this translated code space. An instruction fetch from CPU 11 is received by both Java Instruction Address Generator 21 and Translated Code Space Detector 22. By comparing the address of an instruction fetch to the translated code space, ISC 12 can determine whether the instruction fetch is for a native instruction or for a non-native Java instruction. If the instruction fetch is for a Java instruction, the fetch will be sent to system memory 13. System memory 13 then returns data back to control logic 27. Semantics Table 23 and Information Table 24 are then accessed for the translation of the non-native Java instruction to an instruction that is native to CPU 11. For certain Java instructions, Generate Branch Module 25 and Generate Operand Module 26 will also be accessed during the translation process. The translated instruction will be sent to CPU 11 via multiplexers 29 and 30.

Semantics Table 23 contains several sets of entries, each associated with one Java instruction. Each set of entries may include up to eight PowerPC™ instructions that direct CPU 11 to perform a set of operations required by a particular Java instruction. As a preferred embodiment of the present invention, Semantics Table 23 can store up to eight PowerPC™ instructions for each of the 256 possible Java opcodes. Thus, the total table size of Semantics Table 23 is 8K bytes (i.e., 8 instructions*4 bytes/instruction*256 opcodes). When a Java instruction requires fewer than eight PowerPC™ instructions, the remaining entries in Semantics Table 23 will be left unutilized.

Similarly, Information Table 24 contains several sets of entries, each associated with one Java instruction. Each set of entries comprises a three-bit Java-Length field, a three-bit PowerPC™-Length field, and an eight-bit Generate-Branch field. The Java-Length field indicates the length of a Java instruction. Possible lengths for a Java instruction are one, two, three, four, or five bytes and variable lengths. The PowerPC™-Length field indicates how many of the eight PowerPC™ instructions are utilized in a corresponding entry in Semantics Table 23. Each bit of the Generate-Branch field corresponds to a PowerPC™ instruction in Semantics Table 23 and indicates if that PowerPC™ instruction is a branch instruction that requires the generation of a branch offset.

Figure 3:
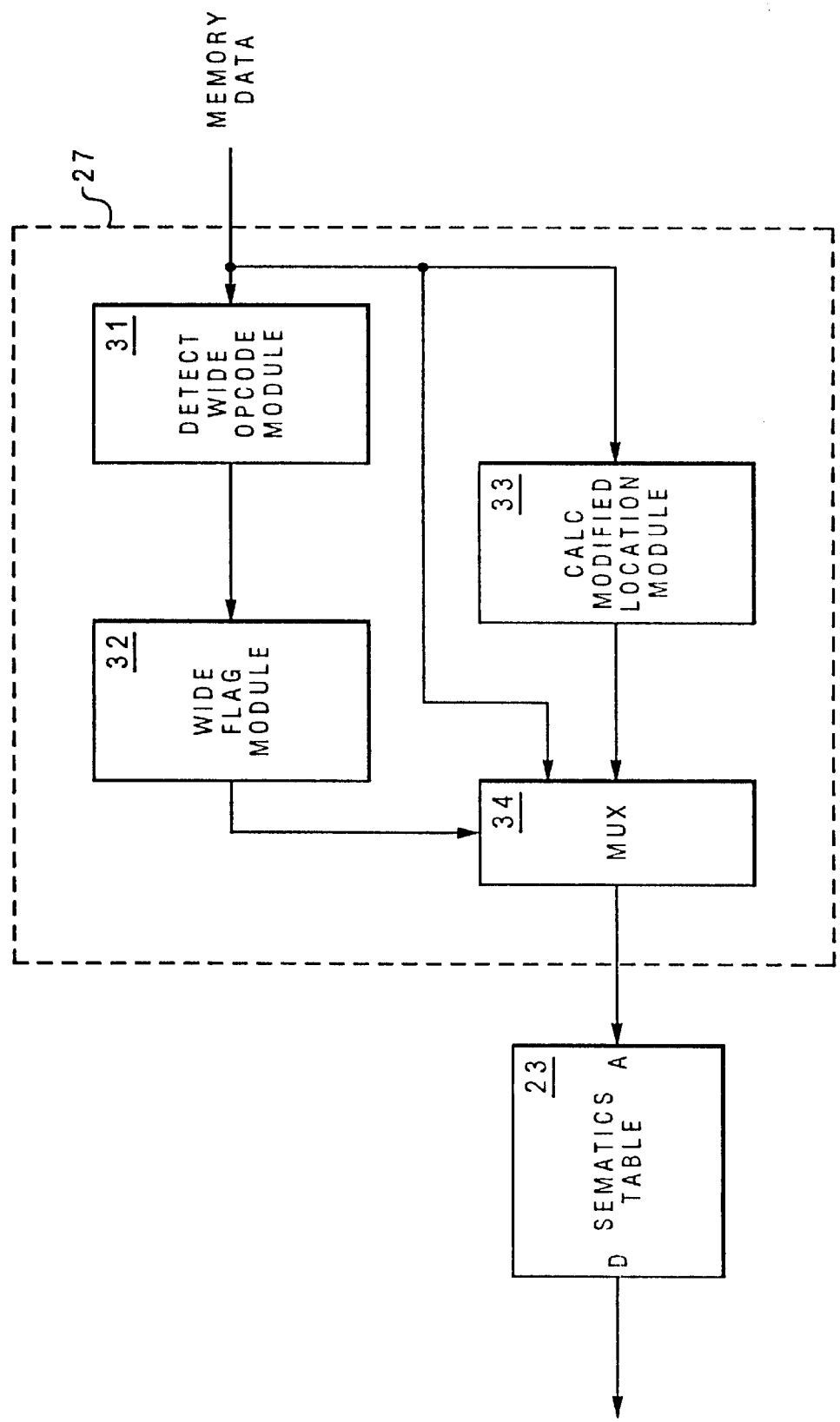
FIG. 3 is a detailed block diagram of the hardware within the instruction set convertor required for executing a non-native wideable instruction, in accordance with a preferred embodiment of the present invention.

Referring now to FIG. 3, there is illustrated a detailed block diagram of the hardware within ISC 12 of FIG. 1, which is required for executing non-native wideable instructions, in accordance with a preferred embodiment of the present invention. As shown, data from the memory (Java Opcode) is sent to a detect-wide opcode module 31 and calc-modified location module 33. If a "wide" flag is set within wide-flag module 32, a specific address location for pointing to Semantics Table 23 will be sent to Semantics Table 23 via multiplexer 34. Detect-wide opcode module 31, wide-flag module 32, calc-modified location module 33, and multiplexer 34 may be part of control logic module 27 of FIG. 2.

According to a preferred embodiment of the present invention, whenever a WIDE instruction is encountered by the ISC, a "wide" flag within wide-flag module 32 is set. When converting an immediate subsequent instruction, the location within Semantics Table 23 from which the PowerPC™ instructions are received is modified. This modification typically consists of adding an offset to the address within Semantics Table 23 after a simple mathematical function and a multiplication by eight has been applied to the Java instruction opcode. This allows one set of PowerPC™ instructions to be passed to the CPU for wideable instructions that are not widened, and a different set of PowerPC instructions for wideable instructions that are widened.

A WIDE instruction only affects an immediate subsequent instruction, and thus, the "wide" flag must only affect the address of the immediate subsequent instruction within Semantics Table 23. After the address for the widened instruction within Semantics Table 23 has been generated, the "wide" flag must be cleared, so that other subsequent instructions will not be affected.

In general, if the PowerPC™ code for a wideable instruction starts at the beginning of a 32-byte block, then the ISC has no way of determining if the previous instruction was a WIDE instruction. This is because the starting address of the previous Java instruction is unknown due to the variable-length nature of Java instruction. Thus, the ISC must force the PowerPC™ code generated for a WIDE instruction plus an immediate subsequent instruction to always reside within the same block. This forced blocking is only done if it is known that the immediate subsequent instruction will also fit into that same block as the WIDE instruction. If the immediate subsequent instruction will not fit, then neither that immediate subsequent instruction nor the WIDE instruction is included in the current block. Thus, at a later time, the CPU will perform a code fetch that begins with the WIDE instruction. The PowerPC™ code generated for the WIDE instruction plus an immediate subsequent instruction is designed such that it can be guaranteed that both always fit in one block if the WIDE is the first instruction of the block. Suffice to say, widened instructions should never occur at the beginning of a block. If a wideable instruction is encountered at the beginning of a block, then the ISC can assume that the instruction is not widened.

Figure 4:
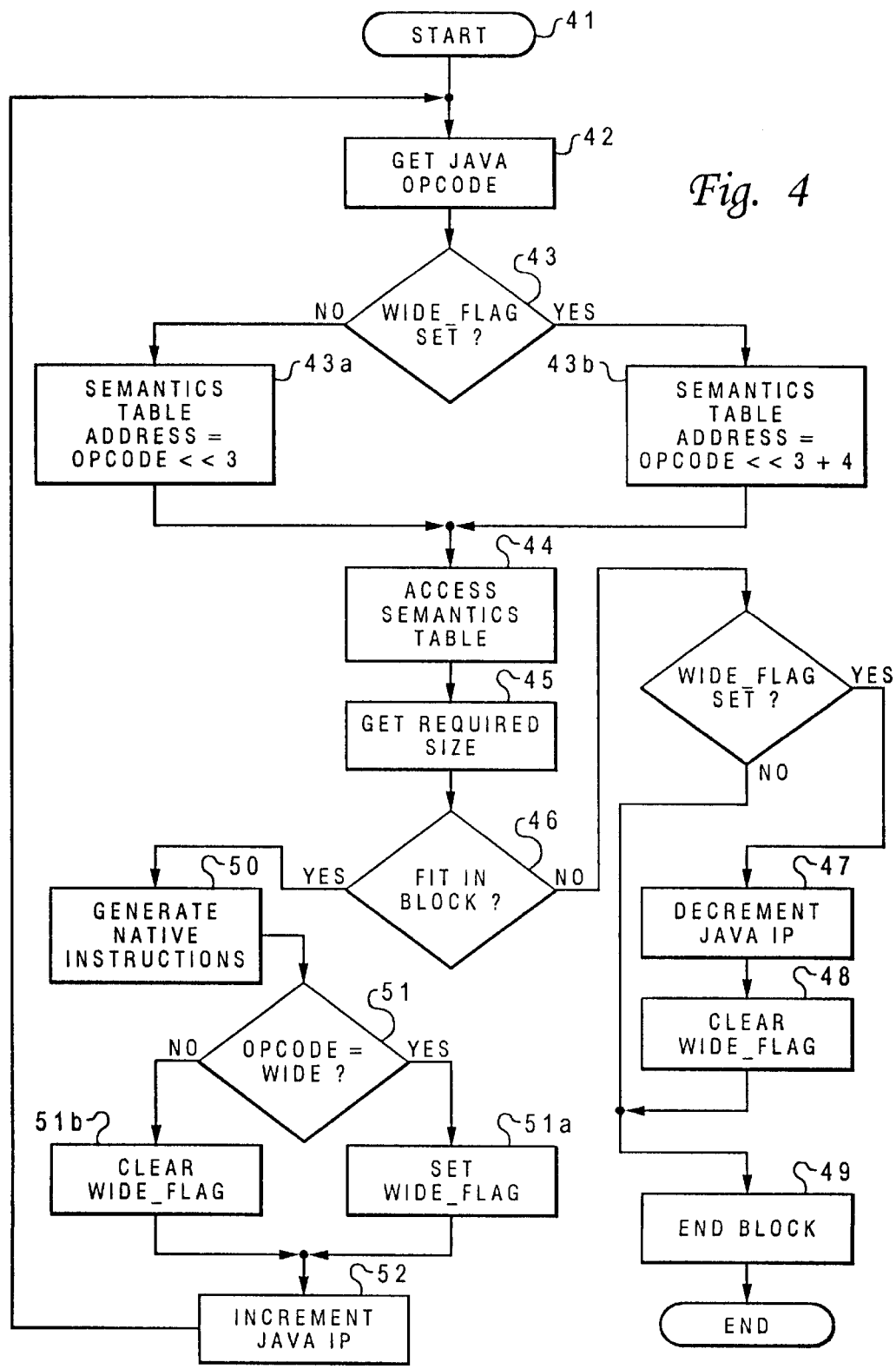
FIG. 4 is a high-level logic flow diagram depicting a method for executing a non-native wideable instruction, in accordance with a preferred embodiment of the present invention.

With reference now to FIG. 4, there is illustrated a high-level logic flow diagram depicting a method for executing a non-native wideable instruction, in accordance with a preferred embodiment of the present invention. Starting at block 41, an instruction fetch is received from the CPU. Then, a Java Instruction Pointer (IP) is calculated from the address of the CPU instruction fetch. The initial value of WIDE_FLAG is always cleared. A Java instruction is loaded from the system memory to the Java IP address. The Java opcode is obtained from the first byte of the Java instruction, as shown in block 42.

A determination is made as to whether or not a WIDE_FLAG is set, as shown in block 43. The address at which to access the Semantics Table is calculated based on the Java opcode and the state of the WIDE_FLAG. (Note that the WIDE_FLAG is always cleared the first time through, but it may be set on subsequent times through.) If the WIDE_FLAG is cleared, the Semantics Table starting address is calculated based on the Java opcode, typically by shifting the Java opcode three bits to the left, as depicted in block 43a. This effectively multiplies the opcode by eight, since there are eight Semantics Table entries per Java instruction. On the other hand, if the WIDE_FLAG is set, the Semantics Table starting address is calculated differently, typically by shifting the Java opcode three bits to the left, then adding four, as depicted in block 43b. This allows the first four entries of the Semantics Table to be utilized for the non-WIDE-preceded code and the second four entries to be utilized for the WIDE-preceded code (assuming four is sufficient).

Next, the Semantics Table is accessed, as depicted in block 44. This includes getting the up-to-eight PowerPC™ instructions and the Information Table data. The "required size," the number of PowerPC™ instructions generated for this Java instruction, is obtained from the PowerPC™-length field of the Information Table, as illustrated in block 45.

A determination is made as to whether or not there is enough room in the current block to include this Java instruction, as shown in block 46. This is done by comparing the number of unutilized spaces in the current block to the "required size," while leaving room for a block-to-block branch instruction that goes at the end of every block.

If there is not enough room, then the current Java instruction is not added to the current block. When a Java wideable instruction is encountered, the ISC must determine whether or not the preceded instruction is a WIDE instruction in order to know how to translate it. However, no information about what Java instructions are put into a given block is known while translating another block. To handle this, it is never allowed for the last Java instruction of a block to be a WIDE instruction. This ensures that, if the first instruction in a block is a wideable instruction, it is certain that the preceding instruction is not a WIDE instruction. If the wideable instruction is not the first Java instruction for a block, then the preceding instruction is known in the current block, and can be determined whether it should be widened or not.

Thus, if the WIDE_FLAG is set at this point, then the last instruction of the block is currently WIDE, which is not allowed. Thus, the WIDE instruction is effectively removed from the current block by decrementing the Java IP, as depicted in block 47. Note that the PowerPC™ instruction NOP (no operation) generated for WIDE has no effect when it is executed by the CPU, thus the PowerPC™ instructions generated for the current block need not be altered to remove it.

The WIDE_FLAG is cleared to ensure that the subsequent block begins with the proper initial value, as depicted in block 48. The Java IP is subsequently utilized to generate the block-to-block branch instruction, as shown in block 49. If it has been decremented to prevent ending the block with WIDE, then its branch offset will be of a value that causes the next block to begin with the WIDE instruction.

On the contrary, if there is room for the current Java instruction, then it is added to the current block by passing the PowerPC™ instructions from the Semantics Table to the CPU, as depicted in block 50. A determination is then made as to whether or not the current Java opcode is WIDE, as shown in block 51. If it is, then the WIDE_FLAG is set so that the subsequent Java instruction will access the modified Semantics Table address, as depicted in block 51b. If it is not WIDE, then the WIDE_FLAG is cleared, as illustrated in block 51a.

Finally, the Java IP is incremented to point to the next Java instruction, as shown in block 52. The process proceeds back to block 42 to continue adding additional Java instructions to the current block.

Referring now to Table I, there is illustrated a detailed example of executing a Java wideable instruction under the prior art. In this example, the WIDE instruction causes the immediate subsequent instruction to have a two-byte index instead of one-byte, and the wideable instruction is a ILOAD instruction. This instruction loads a value from the local variable table, which is pointed to by VARS, and stores it on the stack, which is pointed to by OPTOP. The ILOAD instruction has one operand (INDEX1), which is a one-byte offset into the local variable table, when it is not widened. It has a two-byte operand (INDEX1,1) when it is widened. Note that, since INDEX is a "word" index, it must be multiplied by four to convert it to an address offset. It must then be added to the register VARS to form a full address.

Under prior art, the execution of six PowerPC™ instructions for non-widened ILOADS and the execution of six PowerPC™ instructions are required for widened ILOADs. ILOAD (unwidened) occupies 11 words in the primary cache of the CPU. WIDE+ILOAD occupies 12 words in the primary cache of the CPU.

TABLE I

| Java instruction | PowerPC ™ code generated | Comments |
|---|---|---|
| WIDE INDEX2 | crxor A, A, A | ; set condition reg A |
| ILOAD INDEX1 | bc 12, A, LBL_WIDE | ; branch if A is set |
| | LBL_NORMAL: | |
| | li     r3, INDEX1 | ; r3=index1 |
| | slwi r3, r3, 2 | ; r3=index1*4 |
| | lwzx r3, VARS, r3 | ; r3=local variable |
| | | ; (addr = VARS+index1*4) |
| | stwu r3, 4 (OPTOP) | ; top of stack = r3 |
| | b END | ; branch to END |
| | LBL_WIDE: | |
| | li     r3, INDEX1_2 | ; r3=index1,2 |
| | slwi r3, r3, 2 | ; r3=index1,2*4 |
| | lwzx r3, r5, r3 | ; r3=local variable |
| | | ; (addr = r5+index1,2*4) |
| | stwu r3, 4 (OPTOP) | ; top of stack = r3 |
| | crnand A, A, A | ; clear condition reg A |
| | END: | |

Referring now to Table II, there is illustrated a detailed example of executing a Java wideable instruction under the present invention. This present invention requires the execution of four PowerPC™ instructions for non-widened ILOADS, and the execution of five PowerPC™ instruction for widened ILOADS. ILOAD (unwidened) occupies four words in the primary cache of the CPU. WIDE+ILOAD occupies five words in the primary cache of the CPU.

TABLE II

| Java instruction | PowerPC code generated | Comments |
|---|---|---|
| WIDE INDEX2 | nop | ; flag is set in ISC |
| if flag cleared | | |
|   ILOAD INDEX1 | li     r3, INDEX1 | ; r3=index1 |
| | slwi r3, r3, 2 | ; r3=index1*4 |
| | lwzx r3, VARS, r3 | ; r3=local variable |
| | | ; (addr = VARS+index1*4) |
| | stwu r3, 4 (OPTOP) | ; top of stack = r3 |
| if flag set: | | |
|   ILOAD INDEX1 | li     r3, INDEX1_2 | ; r8=index1,2 |
| | slwi r3, r3, 2 | ; r3=index1,2*4 |
| | lwzx r3, r5 r3 | ; r3=local variable |
| | | ; (addr = r5+index1,2*4) |
| | stwu r3, 4 (OPTOP) | ; top of stack = r3 |

As has been described, the present invention provides an improved method for executing non-native mode-sensitive instruction within a computer system. This improved method requires additional hardware to the ISC that allows more efficient generation of native code for mode-sensitive instructions. The improved method requires fewer instructions to be executed, and occupies less space of the primary cache of the CPU. This results in a significant improvement in performance for wideable instructions. Although the WIDE instruction from the Java instruction set is utilized to illustrate the present invention, it is well understood to those skilled in the art that the method depicted in this disclosure is applicable to any mode-sensitive instruction under any type of non-native instruction set.

While the invention has been particularly shown and described with reference to a preferred embodiment, it will be understood by those skilled in the art that various changes in form and detail may be made therein without departing from the spirit and scope of the invention.

What is claimed is:

1. A computer system capable of executing a non-native mode-sensitive instruction, said computer system comprising:

a system memory for storing said non-native mode-sensitive instruction;

an instruction set convertor having a semantics table, wherein said instruction set convertor is utilized for converting said non-native mode-sensitive instruction to a plurality of native instructions by preemptively testing whether or not said mode-sensitive instruction is preceded by a mode-changing instruction within a single block, and accessing said semantics table for said non-native instruction with an address according to said preemptive test; and a processor for processing said plurality of native instructions from said instruction set convertor.

2. The computer system capable of executing a non-native mode-sensitive instruction according to claim 1, wherein said non-native mode-sensitive instruction includes ILOAD, FLOAD, ALOAD, LLOAD, DLOAD, ISTORE, FSTORE, ASTORE, LSTORE, DSTORE, and RET from Java instruction set.

3. The computer system capable of executing a non-native mode-sensitive instruction according to claim 1, wherein said mode-altering instruction is WIDE instruction from Java instruction set.

4. The computer system capable of executing a non-native mode-sensitive instruction according to claim 1, wherein a size of said block is at least eight instructions.

5. The computer system capable of executing a non-native mode-sensitive instruction according to claim 1, wherein said instruction set convertor further includes a detect wide opcode module, a calc modified location module, and a wide flag module.

6. A method for executing a non-native mode-sensitive instruction, said method comprising the steps of:

storing said non-native mode-sensitive instruction in a system memory;

converting said non-native mode-sensitive instruction to a plurality of native instructions by preemptively testing whether or not said mode-sensitive instruction is preceded by a mode-changing instruction within a single block;

accessing a semantics table for said non-native instruction with an address according to said preemptive test; and processing said plurality of native instructions.

7. The method for executing a non-native mode-sensitive instruction according to claim 6, wherein said non-native mode-sensitive instruction includes ILOAD, FLOAD, ALOAD, LLOAD, DLOAD, ISTORE, FSTORE, ASTORE, LSTORE, DSTORE, and RET from Java instruction set.

8. The method for executing a non-native mode-sensitive instruction according to claim 6, wherein said mode-altering instruction is WIDE instruction from Java instruction set.

9. The method for executing a non-native mode-sensitive instruction according to claim 6, wherein a size of said block is at least eight instructions.

10. The method for executing a non-native mode-sensitive instruction according to claim 6, wherein said accessing step further includes a step of accessing said semantics table with a modified address.

* * * * *

UNITED STATES PATENT AND TRADEMARK OFFICE
CERTIFICATE OF CORRECTION

PATENT NO. : 5,898,850
DATED : Apr. 27, 1999
INVENTOR(S) : *Dickol et al.*

It is certified that error appears in the above-identified patent and that said Letters Patent is hereby corrected as shown below:   Item [56]

On the cover page at *Attorney, Agent, or Firm--*, please change "Casimer K. Sayls" to --Casimer K. Salys--.

Col. 1, lines 62-68, the following text should begin a new line, not forming part of the footnote.

--within the personal computer is required. Conventionally, an instruction set associated with a particular processor is called a "native" instruction set to that computer, while an instruction set that is not specifically developed for that particular processor is called a "non-native" instruction set to that particular computer. In this case, Java would be a non-native instruction set with respect to the Web user's computer.

Signed and Sealed this

Seventh Day of December, 1999

Q. TODD DICKINSON

*Attest:*

*Attesting Officer*      *Acting Commissioner of Patents and Trademarks*